United States Patent
Marcus et al.

(10) Patent No.: US 11,335,962 B2
(45) Date of Patent: May 17, 2022

(54) ELECTRODES AND PROCESS FOR RECONDITIONING CONTAMINATED ELECTRODE MATERIALS FOR USE IN BATTERIES

(71) Applicant: Dynamic Material Systems LLC, Oviedo, FL (US)

(72) Inventors: Kyle Marcus, Orlando, FL (US); Walter Sherwood, Ballston Lake, NY (US); William Easter, Chuluota, FL (US); Arnold Hill, Orlando, FL (US); Gordon Nameni, Menomonee Falls, WI (US)

(73) Assignee: Dynamic Material Systems LLC, Oviedo, FL (US)

( * ) Notice: Subject to any disclaimer, the term of this patent is extended or adjusted under 35 U.S.C. 154(b) by 0 days.

(21) Appl. No.: 17/439,679

(22) PCT Filed: Dec. 18, 2020

(86) PCT No.: PCT/US2020/066135
§ 371 (c)(1),
(2) Date: Sep. 15, 2021

(87) PCT Pub. No.: WO2021/127515
PCT Pub. Date: Jun. 24, 2021

(65) Prior Publication Data
US 2022/0093985 A1  Mar. 24, 2022

Related U.S. Application Data

(60) Provisional application No. 62/951,774, filed on Dec. 20, 2019.

(51) Int. Cl.
*H01M 10/54* (2006.01)
*H01M 4/04* (2006.01)
(Continued)

(52) U.S. Cl.
CPC ......... *H01M 10/54* (2013.01); *H01M 4/0471* (2013.01); *H01M 4/587* (2013.01); *H01M 10/0525* (2013.01)

(58) Field of Classification Search
None
See application file for complete search history.

(56) References Cited

U.S. PATENT DOCUMENTS

2014/0242455 A1  8/2014  Ryu et al.
2015/0259589 A1*  9/2015  Takagi ............... C09D 7/40
                                                    252/75

(Continued)

FOREIGN PATENT DOCUMENTS

CN  109411843  *  3/2019  ........... Y02W 30/84
KR  2018/0038764 A  4/2018

(Continued)

*Primary Examiner* — Maria Laios
*Assistant Examiner* — Angela J Martin
(74) *Attorney, Agent, or Firm* — Paradies Law P.A.; Christopher Paradies

(57) ABSTRACT

A polymer derived ceramic precursor is selected and mixed with a contaminated recycled electrode material or materials. The mixture is pyrolyzed to form a ceramic or ceramic-carbon composite, reduced to a powder and formed into an electrode of a battery, such as a lithium ion battery.

24 Claims, 11 Drawing Sheets

(51) Int. Cl.
  *H01M 4/58*     (2010.01)
  *H01M 10/05*    (2010.01)
  *H01M 10/0525*  (2010.01)
  *H01M 4/587*    (2010.01)

(56) References Cited

U.S. PATENT DOCUMENTS

2016/0056451 A1    2/2016  Singh et al.
2016/0372802 A1* 12/2016  Chiang ................ H01M 10/54
2019/0292441 A1    9/2019  Hill et al.

FOREIGN PATENT DOCUMENTS

WO    WO-2018/169830 A1    9/2018
WO    WO-2020/251604 A1   12/2020

\* cited by examiner

FIG. 8B

| Element | Percent Composition (%) |
| --- | --- |
| Fe | 32.4 |
| Si | 18.0 |
| S | 17.7 |
| Ca | 11.5 |
| Al | 9.1 |
| Cl | 4.0 |
| K | 3.1 |
| Ti | 2.4 |
| P | 0.8 |
| Sr | 0.4 |
| Cu | 0.1 |
| Br | 0.1 |
| Mn | 0.1 |
| Ni | 0.1 |

ELECTRODES AND PROCESS FOR RECONDITIONING CONTAMINATED ELECTRODE MATERIALS FOR USE IN BATTERIES

CROSS RELATED APPLICATIONS

This application is a 371 U.S. national phase application which claims priority to PCT/US2020/066135 filed Dec. 18, 2020 which claims priority to US provisional application 62/951,774, filed Dec. 18, 2019, entitled: ELECTRODES AND PROCESS FOR RECONDITIONING CONTAMINATED ELECTRODE MATERIALS FOR USE IN BATTERIES and are hereby incorporated by reference herein in its entirety.

FIELD OF THE INVENTION

This field relates to recycling materials for use in batteries, especially contaminated carbon from electrodes.

BACKGROUND

Korean Patent Publication No. KR2018/0038764 discloses a slurry for a secondary battery, which discloses percentages of certain additives.

U.S. Patent Publication No. US2016/0056451 discloses a composite material comprising graphene or reduced to graphene oxide and a polymer-derived ceramic material, such as SiOC to to construct anodes, which can be used in batteries, particularly lithium ion batteries, which exhibit relatively high charge capacities at various current densities even after numerous charging cycles, even at high current densities. The SiOC was prepared through the polymer pyrolysis route from liquid 1,3,5,7-tetramethyl-1,3,5,7-tetravinylcyclotetrasiloxane (TTCS, Gelest, Pa.) precursor with 1 wt. % dicumyl peroxide added as the cross-linking agent. The mixture was cross-linked at 380° C. in argon at 5° C. per minute for 5 h, which resulted in a white infusible mass. The infusible polymer was ball-milled into fine powder and pyrolyzed at 1100° C. for 5 h in flowing argon resulting in a fine black SiOC ceramic powder. Then, a 20 mL colloidal suspension of graphine oxide (GO) in 1:1 (v/v) water and isopropanol was made by sonication for 10 minutes. The SiOC fine powder was added to the suspension with sonication for 60 minutes and stirring for 6 h for homogenous mixing. The suspension was then formed into a paper using vacuum filtration though a 10 μm filter membrane (HPLC grade, Millipore). The composite paper was removed from the filter paper and dried, underwent thermal reduction at 500° C. under argon atmosphere for 2 h, and the heat-treated paper was then punched into small circles and was used as anode material for LIB coin cells. The graphene oxide became reduced graphene oxide (rGO) with a loss in mass. Samples had 10, 40, 60 and 80% of SiOC. The 80% SiOC failed early and showed surface cracks. The charge capacity of 40SiOC anode was the highest at approximately 160 mAh/g after 1000 cycles, while 60SiOC and 10SiOC papers were slightly lower at approximately 139 and 115 mAh/g, respectively. The charge capacity of 60SiOC continued to show some decline as the cells were subjected to prolonged cycling, which was not observed in other composite specimens. This data tends to show the importance of graphene in the composite material. The capacities of composite papers were much higher when compared to the capacity of just rGO, which was approximately 58 mAh/g. Thermogravimetric analysis (TGA) analysis was performed in order to ascertain the amount of ceramic present in the rGO/SiOC composite papers. After heat treatment, due to the weight loss by GO, the ratio of SiOC material present in the composite increases depending on the percentage of GO originally present in the papers. The SiOC content in 10SiOC, 40SiOC, 60SiOC and 80SiOC increased from 10 to 30%, 50 to 65%, 65 to 78% and 83 to 92%, respectively. However, this publication failed to disclose mixing SiOC and graphene or graphite prior to pyrolysis. Instead, the ceramic powder of the converted, pyrolyzed SiOC precursor was added to a slurry of graphene oxide to make a paper anode. Powders are not molecularly compounded, rather just mixed together.

Less than 5% of spent lithium ion batteries are recycled in the United States.

There are some efforts to extract cathode metals such as lithium, iron, vanadium, aluminum, cobalt, nickel, and manganese from spent lithium ion batteries.

However, the reuse or recycling of non-metals from batteries is mostly ignored. Particularly, little investigation of reusing materials such as natural or synthetic graphite, hard carbon, misocarbon microbeads (MCMB), graphene, silicon and lithium titanate (LTO) from spent lithium ion batteries has been attempted. Extracting and separating materials for recycling and reuse in batteries is a daunting task. There are no natural sources of graphite being exploited in the United States. The ability to re-use graphite from scrap batteries may reduce the need for importing graphite.

The typical methodology for incorporating high capacity silicon into the carbon/graphite of lithium ion battery anodes was to form some sort of microscale mixture of silicon or silica powder with various forms of conductive carbon such as graphite, carbon nanotubes, graphene, or carbon black. While in many cases these mixtures result in improved specific capacity compared to conventional graphite, they universally suffer from capacity degradation after relatively few cycles (~50-75 charge/discharge cycles) due to damage to the silicon from lithiation/delithiation.

Polymer derived ceramics (PDCs) were considered to be a possible means of avoiding capacity degradation of batteries. However, while there has been significant work evaluating PDCs as replacements for graphite in lithium ion battery anodes; the relatively low electrical conductivity of conventional commercially available PDC resins has kept these materials from demonstrating their full potential.

Applicant's U.S. Application No. 62/861,036 was filed Jun. 13, 2019, which is incorporated in its entirety herein by reference, discloses the creation of silicon containing battery anode materials by formulating anode compositions that contain both high silicon content for high capacity and high carbon content for electrical conductivity, and modified carbon structure for longer cycle life by utilizing novel polymer-derived ceramic (PDC) precursor formulations. The ability to design a ceramic material to incorporate silicon at the molecular level instead of in micron size particles mixed with carbon as is currently done in the art has been found to provide advantages. The precursors are formulated to control silicon, carbon, and oxygen content and structure the carbon phase in the resulting ceramic to significantly increase the specific capacity, while minimizing the distortion of the anode structure due to lithiation/delithiation. This may result in a battery having from three times (3×) higher capacity than current graphite anode materials and longer charge/discharge cycle life compared to current mixtures of silicon particles and carbon sources such as graphite, graphene, nanotubes, and the like. Increases in specific capacity over current anode materials may be achievable at a projected cost comparable to state of the art anodes made with high purity graphite, without sacrificing charge/discharge cycle life. Anodes may be made from low cost starting materials, and the resulting ceramic may be readily formed into the fine powders currently used in commercial battery systems, for example.

A polymer derived ceramic (PDC) composition embodiment incorporating silicon at a molecular level to produce a battery anode material has been disclosed that increases the specific capacity of a battery and increases the life cycle of a battery, wherein the starting material for the PDC composition can include a silicon hydride constituent or a silicon alkoxide constituent. The silicon hydride constituent may be selected from at least one of a silicon hydride monomer, a silicon hydride polymer and mixtures thereof. The silicon hydride constituent can further reacted with vinyl containing organic modifiers; crosslinking additives; and a catalyst. Approximately 100 weight percent of the composition can include approximately 35% to approximately 75% by weight of silicon hydride monomer, silicon hydride polymer and mixtures thereof, approximately 25% to approximately 65% by weight of vinyl containing organic modifiers, approximately 5% to approximately 50% by weight of crosslinking additives, and approximately 0.1% to approximately 4% by weight of a catalyst. Approximately 100 weight percent of the composition can include approximately 40% to approximately 70% by weight of silicon hydride monomer, silicon hydride polymer and mixtures thereof, approximately 33% to approximately 65% by weight of vinyl containing organic modifiers, approximately 10% to approximately 50% by weight of crosslinking additives and approximately 1% to approximately 3% by weight of a catalyst. The silicon alkoxide constituent may be selected from at least one of a silicon alkoxide monomer, silicon alkoxide polymer and mixtures thereof. The silicon alkoxide constituent can further reacted with alkyl alkoxysilanes, a crosslinking additive and a catalyst. Approximately 100 weight percent of the composition of the polymer can include approximately 40% to approximately 100% by weight of phenyl alkoxysilanes, approximately 25% to approximately 65% by weight of methyl alkoxysilanes, approximately 5% to approximately 50% by weight of vinyl alkoxysilanes, approximately 0% to approximately 50% by weight of crosslinking additives, and approximately 0.5% to approximately 4% by weight of a catalyst. Approximately 100 weight percent of the composition of the polymer was the result of hydrolysis/polymerization of a mixture can include approximately 50% to approximately 80% by weight of phenyl alkoxysilanes, approximately 10% to approximately 35% by weight of methyl alkoxysilanes, approximately 20% to approximately 50% by weight of vinyl alkoxysilanes, approximately 10% to approximately 40% by weight of crosslinking additives and approximately 2% to approximately 3% by weight of a catalyst. Approximately 100 weight percent of the composition of the polymer with the filler material can include approximately 10% to approximately 90% by weight of silicon hydride monomer, silicon hydride polymer and mixtures thereof, approximately 10% to approximately 90% by weight of a graphite carbon material selected from synthetic graphite, natural graphite, purified graphite, bituminous coal, anthracite coal, sub-bituminous coal, lignite, peat and mixtures thereof, approximately 0% to approximately 20% by weight of carbon nanotubes, graphite nanofibers, milled graphite fibers, carbon black or graphene materials, and approximately 0% to approximately 20% by weight of a filler selected from silicon micropowder or silicon nanopowder, titanium or titanium-based nanopowder, zirconium or zirconium based nanopowder, tin or tin-based nanopowder; copper or copper-based nanopowder, aluminum or aluminum based nanopowder, and lithium or lithium based compound. Approximately 100 weight percent of the composition of the polymer with the filler material can include approximately 10% to approximately 60% by weight of silicon hydride monomer, silicon hydride polymer and mixtures thereof, approximately 40% to approximately 90% by weight of a graphite carbon material selected from synthetic graphite, natural graphite, purified graphite, bituminous coal, anthracite coal, sub-bituminous coal, lignite, peat and mixtures thereof, approximately 0% to approximately 10% by weight of carbon nanotubes, graphite nanofibers, milled graphite fibers, carbon black or graphene materials, and approximately 0% to approximately 15% by weight of a filler selected from silicon micropowder or silicon nanopowder, titanium or titanium-based nanopowder, zirconium or zirconium based nanopowder, tin or tin-based nanopowder; copper or copper-based nanopowder, aluminum or aluminum based nanopowder, and lithium or lithium based compound. Approximately 100 weight percent of the composition of the polymer with the filler material can include approximately 10% to approximately 90% by weight of a polymer derived from the silicon alkoxide monomer, silicon alkoxide polymer and mixtures thereof, approximately 10% to approximately 90% by weight of a graphite carbon material selected from synthetic graphite, natural graphite, purified graphite, bituminous coal, anthracite coal, sub-bituminous coal, lignite, peat and mixtures thereof, approximately 0% to approximately 20% by weight of at least one of carbon nanotubes, graphite nanofibers, milled graphite fibers, carbon black or graphene materials, and approximately 0% to approximately 20% by weight of a filler selected from titanium or titanium-based nanopowder, zirconium or zirconium based nanopowder, tin or tin-based nanopowder; copper or copper-based nanopowder, aluminum or aluminum based nanopowder, and lithium or lithium based compound. Approximately 100 weight percent of the composition of the polymer with the filler material can include approximately 10% to approximately 60% by weight of a polymer derived from the silicon alkoxide monomer, silicon alkoxide polymer and mixtures thereof, approximately 40% to approximately 90% by weight of a graphite carbon material selected from synthetic graphite, natural graphite, purified graphite, bituminous coal, anthracite coal, sub-bituminous coal, lignite, peat and mixtures thereof, approximately 0% to approximately 10% by weight of at least one of carbon nanotubes, graphite nanofibers, milled graphite fibers, carbon black or graphene materials, and approximately 0% to approximately 15% by weight of a filler selected from titanium or titanium-based nanopowder, zirconium or zirconium based nanopowder, tin or tin-based nanopowder; copper or copper-based nanopowder, aluminum or aluminum based nanopowder, and lithium or lithium based compound.

In one example of a PDC (polymer derived ceramic) composition containing silicon at a molecular level useful for producing a battery anode material wherein 100 weight percent of the composition can include a polymer derived ceramic (PDC) component having a weight percent range of between approximately 1 weight percent to approximately 20 weight percent, the PDC component selected from one of a thermosetting silicon hydride containing PDC polymer and a thermoplastic silicon alkoxide containing PDC polymer, and a graphite carbon component having a weight percent range of between approximately 80 weight percent to approximately 99 weight percent, the graphite carbon component being selected from the group consisting of synthetic graphite, natural graphite, purified graphite, bituminous coal, anthracite coal, sub-bituminous coal, lignite, peat and mixtures thereof. The PDC component may be approximately 1 weight percent, and the graphite carbon component may be approximately 99 weight percent. The PDC component may be up to approximately 20 weight percent, and the graphite carbon component may be approximately 80 weight percent. The graphite carbon component may be between 80 to 85 weight percent. The graphite carbon component may be between 86 to 90 weight percent. The graphite carbon component may be between 90 to 95 weight percent. The graphite carbon component may be between 96 to 99 weight percent. The graphite carbon component may comprise coal. In one example 100% of the carbon is coal or coal derived.

For example, the PDC composition may further include carbon nano materials having a weight percent range of up to approximately 10 weight percent, the carbon nano materials, selected from the group consisting of carbon nanotubes, graphite nanotubes, milled graphite fibers, carbon black, graphene and mixtures thereof. The PDC composition may further include additional fillers having a weight percent range of up to approximately 10 weight percent, the additional fillers, selected from powders containing at least one of silicon, titanium, zirconium, tin, copper, aluminum, lithium, and mixtures thereof.

In another example, a PDC (polymer derived ceramic) composition containing silicon at a molecular level useful for producing a battery anode material wherein 100 weight percent of the composition can include a polymer derived ceramic (PDC) component having a weight percent range of between approximately 70 weight percent to approximately 99 weight percent, the PDC component selected from one of a thermosetting silicon hydride containing PDC polymer and a thermoplastic silicon alkoxide containing PDC polymer, and a graphite carbon component having a weight percent range of between approximately 1 weight percent to approximately 30 weight percent, the graphite carbon powder component being selected from the group consisting of synthetic graphite, natural graphite, purified graphite, bituminous coal, anthracite coal, sub-bituminous coal, lignite, peat and mixtures thereof. The PDC component may be approximately 99 weight percent, and the graphite carbon powder component is approximately 1 weight percent. The PDC component may be approximately 70 weight percent, and the graphite carbon powder component may be up to approximately 30 weight percent. The PDC component may be approximately 71 to 75 weight percent. The PDC component may be approximately 76 to 80 weight percent. The PDC component may be approximately 81 to 85 weight percent. The PDC component may be approximately 86 to 90 weight percent. The PDC component may be approximately 91 to 95 weight percent. The PDC component may be approximately 96 to 99 weight percent. The graphite carbon component may be coal. The PDC composition may further include carbon nano materials having a weight percent range of up to approximately 10 weight percent, the carbon nano materials, selected from at least one of: carbon nanotubes, graphite nanotubes, milled graphite fibers, carbon black and graphene. The PDC composition can further include additional fillers having a weight percent range of up to approximately 10 weight percent, the additional fillers, selected from powders containing at least one of silicon, titanium, zirconium, tin, copper, aluminum, lithium, and mixtures thereof. Another embodiment of a PDC (polymer derived ceramic) composition containing silicon at a molecular level useful for producing a battery anode material wherein 100 weight percent of the composition can consist of a polymer derived ceramic (PDC) component having a weight percent range of between approximately 1 weight percent to approximately 20 weight percent, the PDC component selected from one of a thermosetting silicon hydride containing PDC polymer and a thermoplastic silicon alkoxide containing PDC polymer, and a graphite carbon component having a weight percent range of between approximately 80 weight percent to approximately 99 weight percent, the graphite carbon component being selected from the group consisting of synthetic graphite, natural graphite, purified graphite, bituminous coal, anthracite coal, sub-bituminous coal, lignite, peat and mixtures thereof, wherein the PDC composition solely consists of the PDC component and the graphite carbon component. The graphite carbon component may be coal. Another embodiment of a PDC (polymer derived ceramic) composition containing silicon at a molecular level useful for producing a battery anode material wherein 100 weight percent of the composition, can consist of a polymer derived ceramic (PDC) component having a weight percent range of between approximately 70 weight percent to approximately 99 weight percent, the PDC component selected from one of a thermosetting silicon hydride containing PDC polymer and a thermoplastic silicon alkoxide containing PDC polymer, and a graphite carbon component having a weight percent range of between approximately 1 weight percent to approximately 30 weight percent, the graphite carbon powder component being selected from the group consisting of synthetic graphite, natural graphite, purified graphite, bituminous coal, anthracite coal, sub-bituminous coal, lignite, peat and mixtures thereof, wherein the PDC composition solely consists of the PDC component and the graphite carbon powder component. The graphite carbon component may be coal.

SUMMARY

Compositions and methods of producing electrodes using recycled materials from spent lithium ion batteries allows the recycled materials to be incorporated into battery electrodes, such as lithium ion batteries, with significantly better performance than the spent batteries from which the materials originated. This may be accomplished by coating the post-recycled electrode materials, such as contaminated graphite, with a polymer derived ceramic (PDC) having a composition that is tailored to the post-recycled electrode materials. For example, an anode made from combining a PDC and a contaminated, post-recycled electrode material would not be expected to have both improved cycle life and improved electrical characteristics compared to the original anode materials. Yet, surprisingly and unexpectedly, results prove that even substantially contaminated anode materials may be recycled and reused in lithium ion batteries with improved performance compared to the original batteries, with the only change being the addition of the PDC and processing steps to form microscopically formed silicon carbon compounds, which prevent the contaminants from causing degradation of the anodes with cycling.

This is very surprising, as experts in the field consider any contaminants in state of the art graphite or graphene anodes to especially deleterious to cycle life of the battery. By improving the performance of the anodes incorporating contaminated graphite, the examples in the detailed description provide a way of economically recycling anode materials from spent lithium ion batteries and reusing the materials in batteries using the contaminated materials, with separating out the contaminants, combined with PDCs.

In one example, the PDCs are mixed with contaminated, recycled anode materials and the combination is pyrolyzed in a non-oxidizing atmosphere to create a ceramic-carbon compound and/or composite, together with any contaminants remaining from the recycled anode materials. After pyrolysis the resulting materials may be milled into powders and used to form anodes for batteries, such as lithium ion batteries, having improved electrical properties, without sacrificing cycle life. In particular, the processes using PDCs have shown to improve certain aspects of battery performance and are considered a viable solution for improving the capacity and cycling performance of post-recycled, contaminated electrode materials, without the need to remove the contaminants before reusing the post-recycled, contaminated electrode materials. Surprisingly and unexpectedly, tailored PDCs enhance the performance of even highly contaminated electrode materials, which decreases the cost of "cleaning up" of scrap electrode materials and reduce waste during recycling of batteries aimed, primarily, at recycling of metals from spent lithium ion batteries. Scrapped and/or post-recycled lithium ion battery materials may be reused and actually enhanced before reuse in a new generation of lithium ion batteries that have both high capacity and long cycle life, for example.

In one example, post-recycled electrode materials are formulated to have high silicon content and/or high carbon content PDCs organized at a molecular level to improve capacity and conductivity, respectively. The addition of PDCs offer a pathway to form modified carbon structures during materials processing, which contributes to improvements in capacity, cycle life, and/or charging capabilities of cells made using anodes made with the new materials incorporating PDCs and post-recycled contaminated anode materials.

Precursors used in synthesizing the selected PDCs have very specific control over elemental and molecular content of silicon, carbon, and oxygen, for example. Thus, the PDCs may be tailored to be used with different types of post-recycled, contaminated anode materials. The specific, elemental control for PDCs is not limited to silicon, carbon, and oxygen components and may include other elements. As PDCs become ceramics upon pyrolysis, the processing may improve mechanical properties of post-recycled electrodes made by combining the PDCs with post-recycled, contaminated anode materials, providing a barrier that protects against undesirable side reactions that might occur otherwise, especially with respect to remaining contaminants. Such impurities would be expected to greatly disadvantage batteries made using the contaminated anode materials. And past attempts have shown that many battery components left over from processing post-recycled materials do hinder battery performance.

For example, contaminants may comprise, but are not limited to, copper, aluminum, metal oxides, and electrolyte components and may include other byproducts created from side reactions during battery cycling of the original batteries from which the contaminated anode materials are extracted. It is thought, without being limiting in any way, that insulating impurities are leftover from the separator and binder materials, but the effect of these on lowering performance of a cell using the recycled materials may be compensated for by the substantial increase in capacity performance offered by PDCs combined with the post-recycled, contaminated anode materials.

Also, PDC compositions may be tailored to restore any critical elements in the cathode that were unintentionally removed during the reclamation/recycling processes such as cobalt or nickel. It is thought, without being limiting in any way, that the PDCs coat and shield any detrimental contaminants from the recycled materials, at the molecular or nanoscale, such that the effect of such contaminants on the electrode performance is reduced. This would help to explain the surprising and unexpected results.

In one example, PDCs enhance both post-recycled anode (PRA) and post-recycled cathode (PRC) materials. PRA materials consist but are not limited to graphite, hard carbon, misocarbon microbeads (MCMB), graphene, silicon and lithium titanate (LTO). PRC materials consist but are not limited to lithium, iron, vanadium, aluminum, cobalt, nickel, manganese, and the corresponding oxides and phosphates. Thus, PDCs may be used in the production of both anodes and cathodes.

For example, processes and compositions for coating reclaimed, recycled, or reprocessed battery electrode materials may use polymer derived ceramic (PDC) precursors. Then, the combined PDCs and even highly contaminated post-recycled materials may be cured and pyrolyzing. For example, the pyrolyzed materials may be milled into powders and incorporated into new battery electrodes, surprisingly and unexpectedly improving both capacity and cycle life. The battery electrode materials may be recycled from spent lithium ion batteries, lithium polymer batteries or both lithium ion batteries and lithium polymer batteries. In an alternative example, battery electrode materials may be reclaimed from lead acid or advanced lead acid batteries. The new PDC-derived anodes may be incorporated into new lithium ion and/or lithium polymer batteries with superior performance compared to the lithium ion/lithium polymer batteries from which the contaminated, reclaimed, reprocessed, recycled electrode materials originated. For example, the reclaimed and coated battery electrode materials may be anode materials from spent lithium ion or lithium polymer batteries, such as contaminated graphite, contaminated hard carbon, contaminated misocarbon microbeads (contaminated MCMB), contaminated graphene, contaminated silicon and contaminated lithium titanate (LTO). Alternatively, cathode materials may be recycled such as lithium, iron, vanadium, aluminum, cobalt, nickel, manganese, and corresponding oxides and phosphates thereof.

In one example, PDC precursors are tailored specifically for reclaimed, recycled, and/or reprocessed battery electrodes that encapsulate or otherwise react with undesirable impurities in the reclaimed, recycled, and/or reprocessed battery electrode materials, substantially neutralizing the expected deleterious effects of such contaminants. In another example, PDC precursors may also be tailored to replenish or add back critical elements of battery electrode materials or compounds depleted by use, reclamation, recycling, and/or reprocessing processes or procedures. For example, selection of the proportion of silicon and carbon may be used to enhance specific capacity of reclaimed, recycled, and/or reprocessed battery electrode materials, without reducing conductivity and/or cycle life. For example, PDC precursors may be tailored to increase the number of useful charge/discharge cycles, while retaining at least 80% of the original capacity (defined as cycle life at 80% of the original capacity). PDC precursors may be tailored to improve a plurality of the specific capacity, conductivity, and cycle life at 80% of the original capacity, with or without contaminants in the reclaimed, recycled and/or reprocessed battery electrode materials. Process and compositions of PDC precursor polymers tailored specifically to replenish or add back critical elements or compounds in lithium ion and/or lithium polymer batteries depleted by the reclamation, recycling, and/or reprocessing procedure for battery electrode materials.

In one example, processes and compositions of PDC precursors may be tailored to improve the specific capacity of the reclaimed, recycled, or reprocessed lithium ion and/or lithium polymer battery electrode materials, without sacrificing the cycle life at 80% of the original capacity. For example, the number of charge/discharge cycles attainable, while retaining at least 80% of the original capacity, may be increased for new lithium ion batteries or lithium polymer batteries comprising a source of contaminated, post-recycled electrode materials, when combined with PDC precursors. For example, the process comprises pyrolysis of the materials combined with PDC precursors and milling of the resulting pyrolyzed materials to form powders. Contaminants may be present in reclaimed, recycled, and/or reprocessed lithium ion and/or lithium polymer battery anode materials and may be removed or partially removed, such as by leaching, for example. The resulting anode materials, having less contaminants, may be combined with PDCs. Alternatively or in addition to any removal of contaminants, the PDCs may be selected to neutralize the expected deleterious effects of any contaminants introduced by the post-recycled materials. For example, cathode materials may be digested such that desirable elements and compounds are concentrated in solution and subsequently precipitated out as elements and/or compounds for reuse in batteries.

Alternatively, contaminated, post-recycled materials from batteries may be used in ceramic composites, ceramic fibers, or ceramic composite matrix materials, such as fillers in high performance engineering polymers including, but not limited to, PEEK, PAEK, Cyanate ester, PPO, PPS, Polyimide, Polyamideimide, or other high performance polymers to improve mechanical, thermal, or electrical properties. For example, PDC precursors may include such fillers and may be designed to be high temperature, thermoplastic or thermosetting resins, including such resins optimized for 3D printing, for example.

BRIEF DESCRIPTION OF THE DRAWINGS

The following drawings are illustrative examples and do not further limit any claims that may eventually issue.

FIG. 8B illustrates a percent composition break down of the various contaminants in FIG. 8A.

When the same reference characters are used, these labels refer to similar parts in the examples illustrated in the drawings.

DETAILED DESCRIPTION

Figure 1:
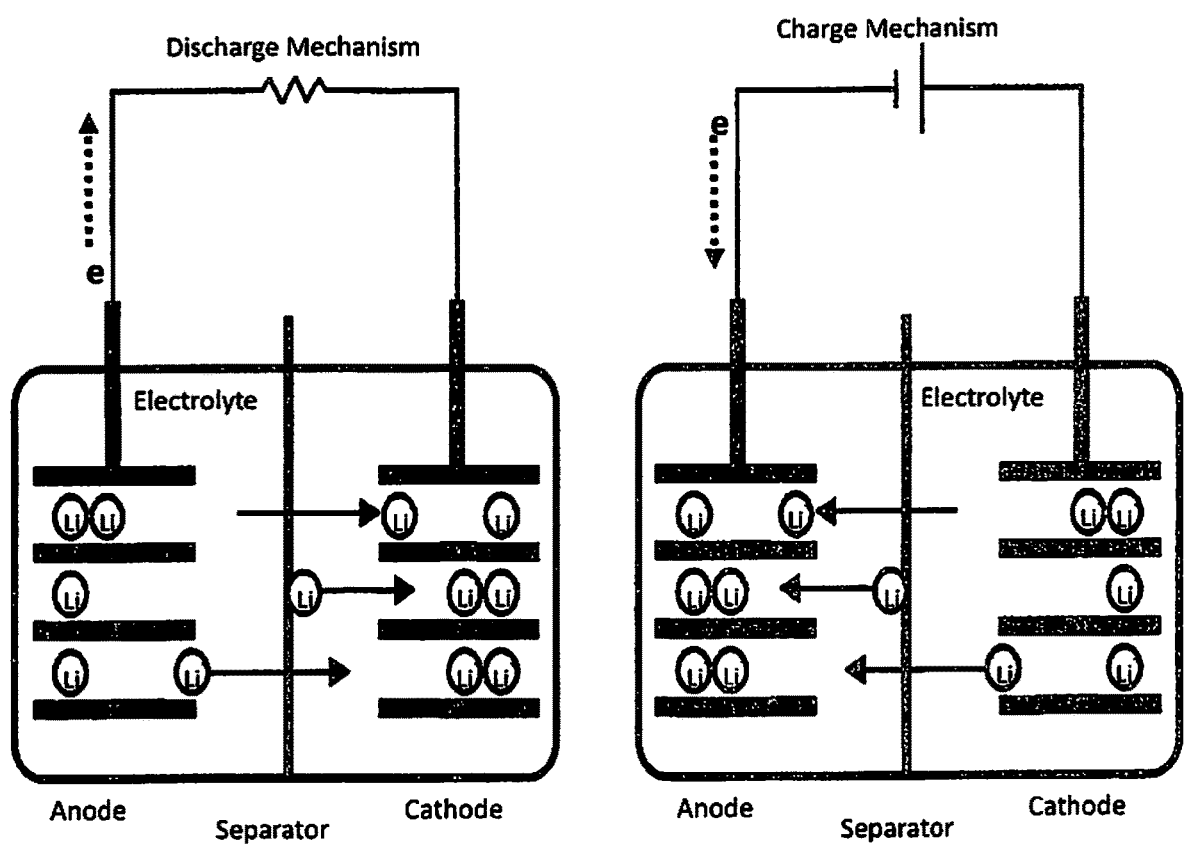
FIG. 1 illustrates conceptual operation of a reversible (i.e. rechargeable) lithium ion battery cell.

In FIG. 1, a reversible lithium ion battery is shown with discharge (left) and charge (right) mechanisms showing the movement of lithium ions (Li+) and electrons (e−) during charging and discharging. Reversible or secondary batteries are electrochemical cells that store electrical energy through reversible chemical reactions. This reversible process may occur many times without significant degradation in modern lithium ion batteries. The mechanism is as follows: during discharge, electrons flow from the anode (negative electrode) and are transferred to the external load. Concurrently, lithium ions migrate from the anode to the cathode through an electrolyte that acts as the medium for facilitating ion transfer. A separator sits between the opposing electrodes to allow for the passage of ions as well as an insulating barrier between the electrodes. During charging, the opposite occurs. Electrons are supplied by an external source to the anode while lithium ions migrate from the cathode to the anode, recharging the battery.

Figure 2:
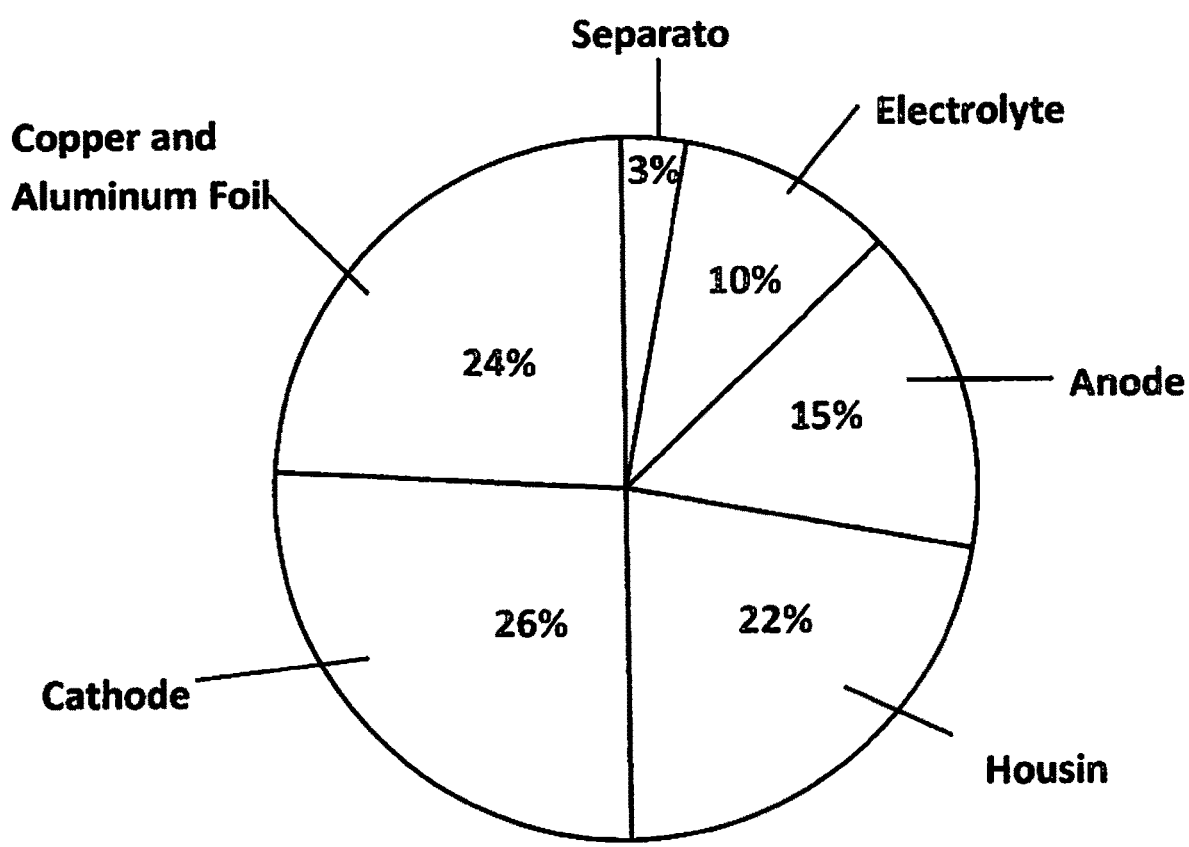
FIG. 2 illustrates typical materials found in a 18650 lithium ion battery with a Li(Ni0.45Mn0.45Co0.10)O2 cathode and graphite anode.

FIG. 2 provides a general materials breakdown from a typical 18650 lithium ion battery with a Li(Ni0.45Mn0.45Co0.10)O2 cathode and graphite anode. Copper and aluminum foil are derived from the current collector for the anode and cathode, respectively. A separator consists of a plastic, polymer, gel, glass, or ceramic material. An example of a binder material could be polyvinylidene fluoride (PVDF) or other polymer or non-polymer materials.

Figure 3:
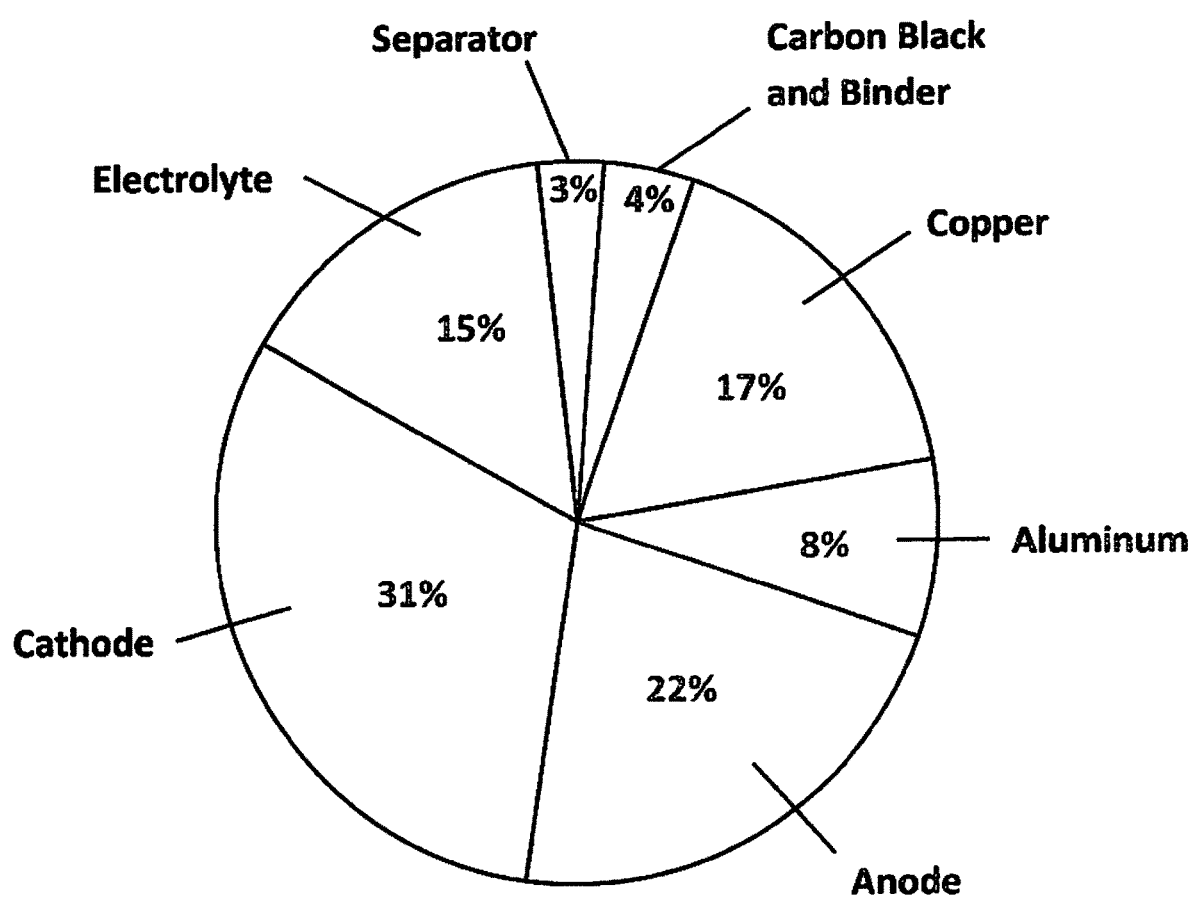
FIG. 3 illustrates typical materials found in a battery with a lithium nickel cobalt aluminum oxide (NCA) cathode material and graphite anode

FIG. 3 provides a general component breakdown for a lithium nickel cobalt aluminum oxide (NCA) cathode material and graphite anode material battery with emphasis on what specific materials are considered for recycling. Copper and aluminum foil are derived from the current collector for the anode and cathode, respectively. A separator consists of a plastic, polymer, gel, glass, or ceramic material. An example of a binder material could be polyvinylidene fluoride (PVDF) or other polymer or non-polymer materials. This chart shows in a general sense what contaminants need to be considered when attempting to reuse recycled battery components in these lithium ion batteries.

Figure 4:
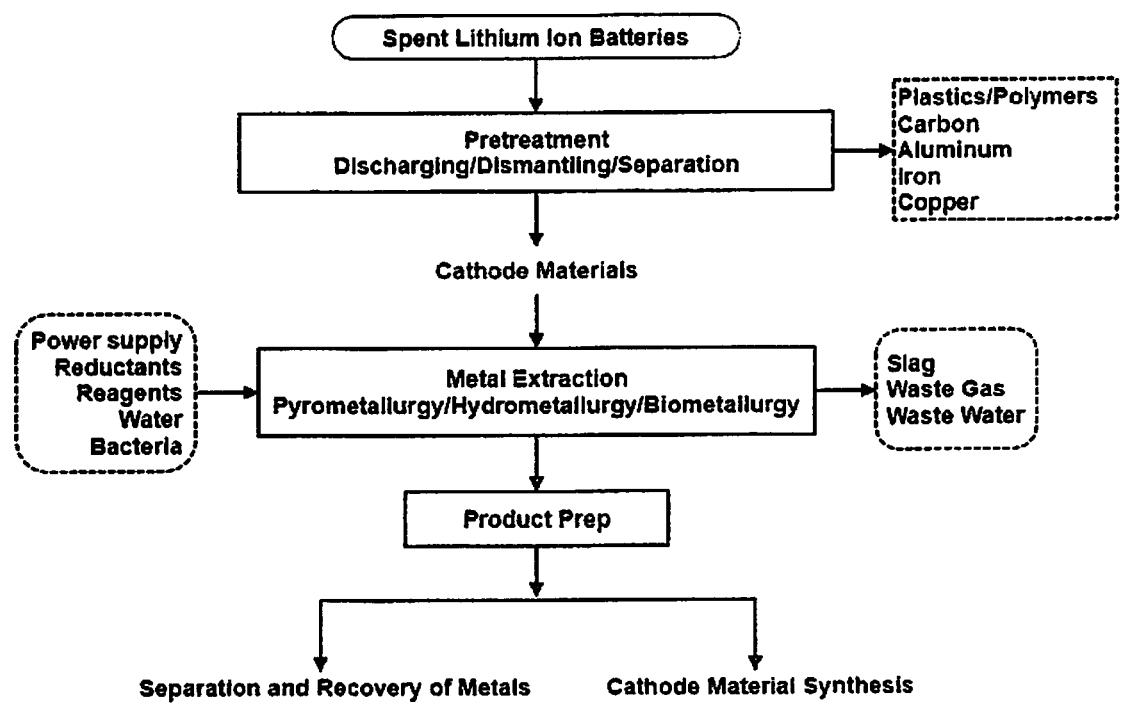
FIG. 4 illustrates a flowchart for recycling materials from a battery with materials such as illustrated in FIG. 3.

FIG. 4 provides a flowchart for various methods and techniques established to recycle lithium ion battery components as described in FIG. 3. Generally, spent lithium ion batteries go through a pretreatment processes that can include discharging, dismantling, and separation of various components, which fall into two categories. One of these categories includes the cathode materials and the second category includes plastics/polymers, carbon, aluminum, iron, and copper as examples. The carbon in this case can include but is not limited to natural or synthetic graphite, hard carbon, mesocarbon microbeads (MCMB) and graphene. The second category may also contain other materials including but not limited to silicon and lithium titanate (LTO). Cathode materials will proceed to a metal extraction step where processes include pyrometallurgy, hydrometallurgy and/or biometallurgy where inputs are required that include a power supply, reductants, reagents, water and/or bacteria. Byproducts are created in the form of slag, waste gas, and/or wastewater. Desired products proceed to product preparation for either separation and recovery of metals or cathode material synthesis.

Figure 5:
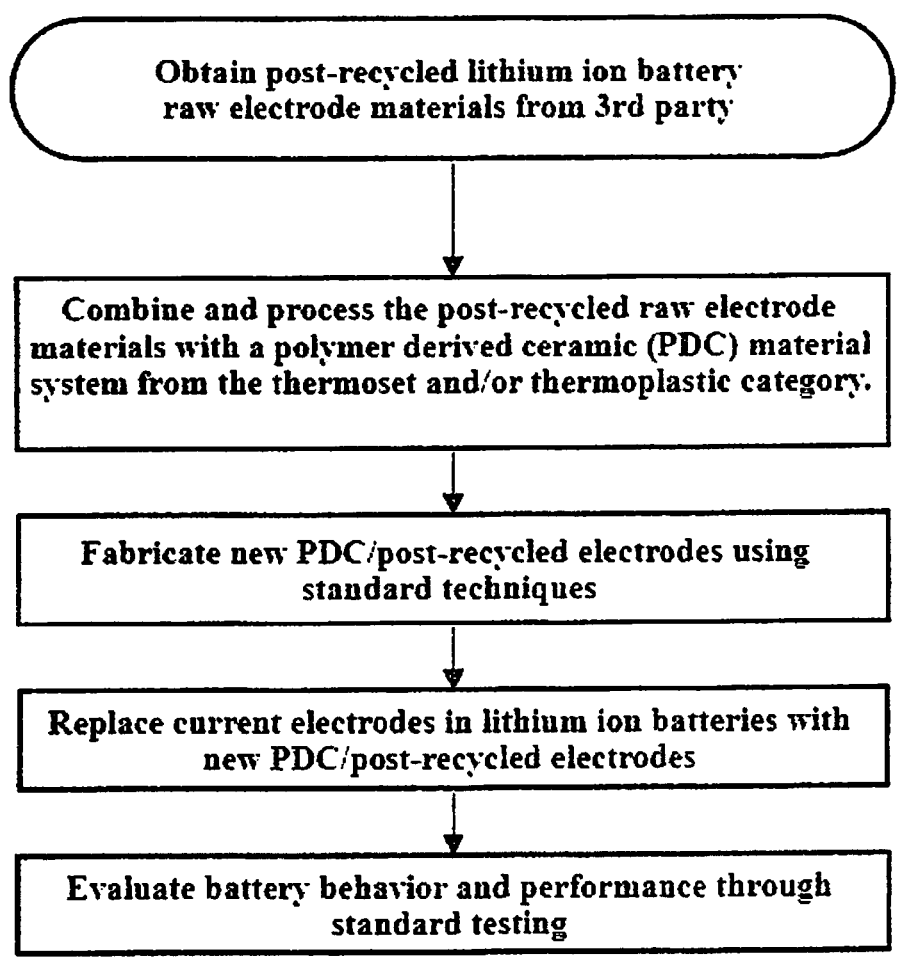
FIG. 5 illustrates another process.

FIG. 5 provides a flowchart describing an example of a pathway from receiving and processing of raw materials to reimplementation of processed materials into a lithium ion battery system. Generally, a first step includes obtaining post-recycled lithium ion battery raw electrode materials, which may be provided by a third party or external source or as a result of processes in FIG. 4. Post-recycled lithium ion battery raw electrode materials may include anode and cathode materials including but not limited to natural or synthetic graphite, hard carbon, misocarbon microbeads (MCMB), graphene, silicon, lithium titanate (LTO), lithium, iron, vanadium, aluminum, cobalt, nickel, and manganese. These materials may comprise contaminants. Herein, the term contaminants means containing impurities that are generally considered to be deleterious to the reuse of materials for their original purpose. Post-recycled raw electrode materials are combined and processed with a polymer derived ceramic (PDC) material system from the thermoset and/or thermoplastic category. PDC/post-recycled electrodes may be fabricated using standard techniques, such as those disclosed in the background, which provide a thin disk of material. For example, a source of natural or synthetic graphite, hard carbon, misocarbon microbeads (MCMB), graphene, or any combination of these may be combined with a polymer derived ceramic precursor polymer and may be mixed together homogeneously. Then, the mixture may be processed by heating under a non-oxidizing atmosphere, eventually increasing the temperature to a pyrolysis temperature, e.g. 900 to 1200 degrees centigrade, more preferably at least 1000 degrees centigrade. The contaminants may be neutralized by the PDC eliminating or reducing any deleterious effects that would otherwise be caused by the contaminants. Then, the pyrolyzed substance may be formed into a powder, such as by milling or the like. The resulting PDC/post-recycled powder may be formed into electrodes, such as an anode for a lithium ion or lithium polymer battery.

Figure 6:
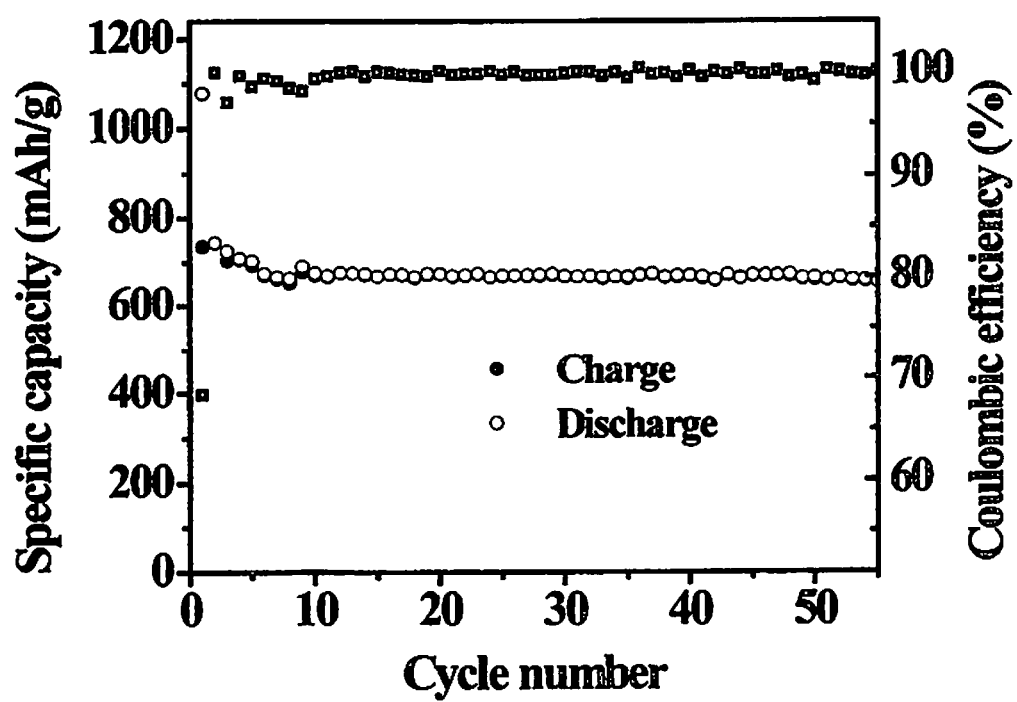
FIG. 6 illustrates graphically charge, discharge, and coulombic efficiency performance for an anode containing a contaminated carbon source that has been processed with a PDC from the thermoplastic category, for example.

FIG. 6 graphs charge, discharge, and coulombic efficiency performance for an anode containing a contaminated carbon source that has been processed with PDC via the process of FIG. 5. The PDC is a thermoplastic category of PDC. The anode material in this example contains approximately 50 wt % of the contaminated carbon source and 50 wt % of the thermoplastic PDC. The contaminated carbon source is referenced and characterized in FIGS. 8A and 8B. The performance of the anode material in a half cell configuration is shown for Li/Li+; 85:10:5 (AM:PVDF:Conductive Carbon Additive in NMP) with a Cycling Rate of 74 mA/g; Potential Window of 0.01-3V; and Mass Loading of 1.96 mg/cm2.

Figure 7:
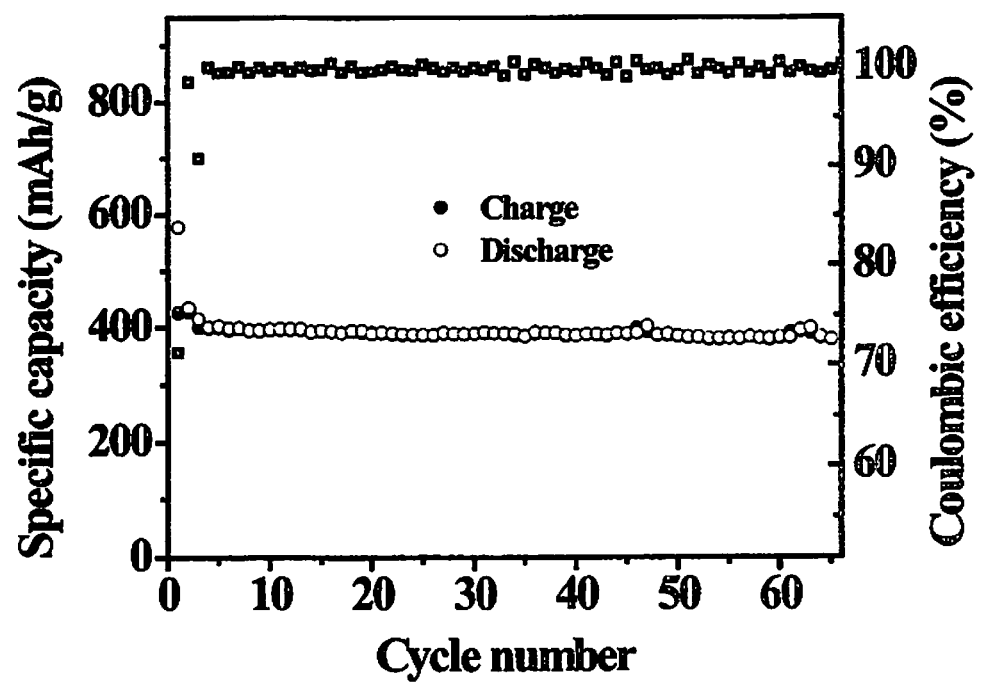
FIG. 7 illustrates graphically charge, discharge, and coulombic efficiency performance for an anode containing a contaminated carbon source that has been processed with a PDC from the thermoset category, for example.

FIG. 7 illustrates charge, discharge, and coulombic efficiency performance, as in FIG. 6, except for a PDC from the thermoset category. The anode material in this example contains approximately 61.5 wt % of the contaminated carbon source and 38.5 wt % of the thermoset PDC. The contaminated carbon source is referenced and characterized in FIGS. 8A and 8B. Performance of the anode material in a half cell configuration vs Li/Li+ is shown; 85:10:5 (AM:PVDF:Conductive Carbon Additive in NMP); Activation Rate: 37 mA/g; Cycling Rate: 74 mA/g; Potential Window: 0.01-3V; Mass Loading: 3.17 mg/cm2

Figure 8A:
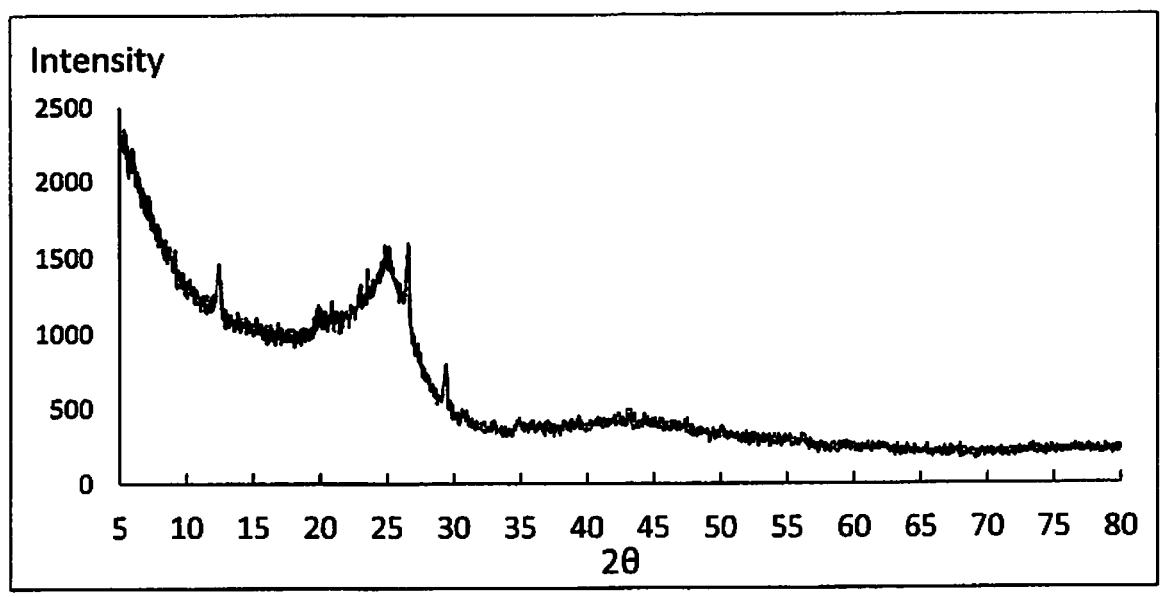
FIG. 8A illustrates contaminants using X-ray Diffraction Spectroscopy (XRD) data for a carbon material and PDCs.

FIG. 8A shows an example of X-ray Diffraction Spectroscopy (XRD) data for contaminated carbon that was used in the examples of FIGS. 6 and 7. The high level of contaminants within the carbon material are contained or neutralized by integrating a selected PDC materials system and the contaminated carbon according to exemplary processes for producing an electrode. In this example, contaminated carbon material contains many impurities including quartz, calcite, and possibly kaolinite in addition to elemental contaminants as shown in FIG. 8B. FIG. 8B lists the composition of the contaminants as a percentage of total contaminants in the contaminated carbon. The high level of contaminants within the filler material are contained and neutralized by integrating the contaminated carbon into a PDC materials system using a PDC polymer precursor.

In alternative examples two different types or categories of PDC precursors are used to treat the contaminated carbon source, a first type is a thermoplastic PDC and a second type is a thermoset PDC. The thermoset PDC crosslinks during a curing step, usually prior to pyrolysis of the PDC precursor. Both create ceramics upon pyrolysis, such as Silicon, Oxygen and Carbon containing ceramics. Both coat the contaminants and the carbon of the contaminated carbon and both improve properties electrodes made from the contaminated scrap and/or recycled battery electrode materials. Both provide electrodes that may be used to fabricate new batteries. Surprisingly and unexpectedly, the contaminates do not cause expected deleterious effects when processed according to this method, and the battery systems demonstrates higher performance than the spent batteries that were the source of the recycled materials.

For example, post-recycled anode (PRA) and post-recycled cathode (PRC) materials are prepared using PDCs to coat and protect powdered, contaminated carbon or other materials from spent batteries. PRA materials comprise graphite, hard carbon, mesocarbon microbeads (MCMB), graphene, silicon, lithium titanate (LTO), or combinations of these, for example. PRC materials comprise lithium, iron, vanadium, aluminum, cobalt, nickel, manganese, or the corresponding oxides, phosphates or combinations of these.

For example, PDC coatings on reclaimed battery electrode materials are formed according to the following example.

Step 1. Select a PDC. A group of ceramic materials resulting from the pyrolysis of precursors synthesized by hydrosilation of one or more silicon hydride containing monomers or polymers and one or more cyclic polyenes. For example, silicon hydride containing monomers may comprise phenylsilane, diphenylsilane, methylphenylsilane, or methylphenylvinylsilane. For example, silicon hydride containing polymers may comprise tetramethylcyclotetrasiloxane, methylhydrogen siloxane, or co-polymers of dimethylsiloxane/methylhydrogen siloxane, phenylmethylsiloxane/methylhydrogen siloxane, or diphenylsiloxane/methylhydrogen siloxane. For example, cyclic polyenes may be selected comprising cyclobutadiene, cyclopentadiene, cyclohexadiene, norbornadiene, or bismaleimides, such as N,N'-p-phenylenebismaleimide, for example. For example, polycyclic polyenes may be selected comprising cyclopentadiene oligomers such as dicyclopentadiene, tricyclopentadiene or tetracyclopentadiene, norbornadiene dimer, dimethanohexahydronaphthalene, bicycloheptadiene (i.e., norbornadiene) and its Diels-Alder oligomers with cyclopentadiene (e.g., dimethanohexahydronaphthalene), or substituted derivatives of any of these, such as methyl dicyclopentadienes. Alternatively, other monomers or polymers may be selected comprising unsaturated side groups or end groups that may be reacted via hydrosilation with silicon hydride containing monomers or polymers (including, without limitation, any of the silicon hydride containing polymers disclosed in this application). In one example, these monomers may comprise a styrene monomer, a divinyl benzene, or a low molecular weight polybutadiene. The amounts of reactants may range from a silicon hydride/unsaturated hydrocarbon group ratio of 9/1 up to 1/2 on a molar basis. The 1/2 has the highest carbon content. For example, PDCs successfully used for battery anode materials have ranged from a ratio of 6/1 to 1.2/1.

It is thought, without being limiting in any way, that hydrosilation of cyclic polyenes results in a ceramic where carbon rich regions may be highly strained. The highly strained regions may be better able to withstand lithiation/delithiation cycling, resulting in cycle life similar to pure graphite. These highly strained regions may be thought of as "electrically close" to silicon atoms such that the specific capacity is substantially greater than pure graphite. Indeed, the specific capacity may be greater than expected for a mixture of micron level silicon particles and graphite particles (or any other form of carbon).

Once synthesized, the resulting PDC precursors may be further reacted with one or more, hydride containing, vinyl containing, or allyl containing monomers or polymers to assist in crosslinking using platinum based catalysts, peroxide based initiators/catalysts, or organometallic catalysts. Vinyl containing monomers include but are not limited to: divinyl benzene, divinyltetramethyldisiloxane, or tetramethyltetravinylcyclotetrasiloxane. Vinyl containing polymers may comprise polydimethylvinylsiloxane, polyphenylmethylvinylsiloxane, polydimethylvinylsiloxane, or polydimethyldiphenylvinylsiloxane (which are polymers synthesized as disclosed in step 2, below).

For example, catalysts may be utilized to crosslink PDC resins prior to pyrolysis at a 0.25% to 4% concentration, based on mass of the PDC resins. Catalysts may be selected from catalysts based on platinum, organic peroxides, or organometallic catalysts. For example, Ashby's catalyst, Dicumyl peroxide, or zinc octoate may be used. Alternatively, many variants of each type may be used, such as a commercially available catalyst, and each type is expected to be effective. These polymers, with or without crosslinking additives, may be cured without any type of catalyst by heating, such as to a temperature from 160 C. to 250 C., in nitrogen or other inert gas, for example.

Tables 1 and 2 provide examples of PDC precursor material compositions.

Step 2. Reclaimed/Recycled Battery electrode material coatings may comprise a pyrolyzed result of polymer precursors synthesized by the acid or base hydrolysis/condensation/polymerization of silicon alkoxides, for example. For example, silicon alkoxide monomers may comprise Methoxysilanes, Ethoxysilanes, Propoxysilanes, or Butoxysilanes. For example, these may comprise silicon atoms with one or more alcohol groups attached to the silicon atom, and there may be up to 4 alcohol groups attached to the silicon atom, such as tetraethoxysilane or "TEOS". Alcohols may be reacted to form an alkoxide group and may comprise any of the alcohol groups from methanol to butanol. For example, a silicon reacted with methanol would have up to 4 methoxy groups attached and is called "TMOS". Other alkoxides such as tin, titanium, germanium, lithium, aluminum, zirconium, lead, and the like may also be reacted during the silicon alkoxide synthesis process, adding one or more of these metals or oxides of these metals into a resulting ceramic.

Preferred examples of alkoxysilanes for synthesizing a battery anode using PDC precursor materials may be a silicon ethoxysilane type monomer, silicon methoxysilanes, propoxysilanes, or butoxysilanes. Ethoxysilane monomers may be selected for producing battery anode PDC precursors such as Phenyltriethoxysilane, Diphenyldiethoxysilane, Phenylmethyldiethoxysilane, Vinylphenyldiethoxysilane Methyltriethoxysilane, Dimethyldiethoxysilane, Methyldiethoxysilane, Triethoxysilane, Methylvinyldiethoxysilane, Vinyltriethoxysilane, Trimethylethoxysilane, or Tetraethoxysilane. Alternatively, methoxy analogs of the above, as well as propoxy or butoxy analogs may be used, also. The reaction efficiency for polymerization may decrease as the number of carbon atoms in the alkoxy group increases, however. Battery anode material coating PDC precursors may be synthesized also by hydrolysis/polymerization/condensation of the corresponding chlorosilane analogs to the monomers/polymers listed above. A PDC precursor may be produced by acid catalysis of a range of mixtures of ethoxysilanes, which may be cured using platinum, peroxide, or organometallic catalysts, for example. These may be designed to provide high ceramic yield, high silicon content and a pyrolyzed ceramic microstructure after pyrolysis from 900 C. to 1200 C. These examples provide both electrical conductivity and a stable structure to withstand many lithiation/delithiation cycles without damage while still taking advantage of the capacity increase due to a high silicon content.

For example, a mole percentage of each monomer may range from 0 to 90%. More preferably, a phenyl containing monomer may range from 10 to 80%, and a methyl containing monomer may range from 10 to 50%, and a vinyl containing monomer may range from 0 to 60%. A hydride containing monomer such as a Methyldiethoxysilane or Triethoxysilane may be used, also, for example, in a range from 5 to 35%, for example. Polymers produced may be crosslinked via catalysis using platinum based, peroxide based, or organometallic catalysts, as described previously. Polymers described in Step 2, above, may also be crosslinked by addition of more unsaturated hydrocarbon containing monomers or polymers, such as any of the polymers synthesized according to Step 1, above, for example. For example, unsaturated hydrocarbon containing materials may comprise any of those listed in Step 1, above. For example, Silicon hydride containing monomers and polymers may be used, also, as crosslinking agents (including those polymers synthesized according to Step 1, above, for example).

Catalysts may be used to crosslink PDC resins prior to pyrolysis. For example, catalysts may be added at a 0.25% to 4% concentration based on the mass of the resin. Examples of catalysts may include those based on platinum, organic peroxides, or organometallic catalysts. For example, Ashby's catalyst, Dicumyl peroxide, or zinc octoate may be used. There are many variants of each type that may be used. Commercially available catalysts of each type may be used, for example.

Generally, polymers, with or without crosslinking additives, may be cured, also, without any type of catalyst by heating to a curing temperature, such as 160 C. to 250 C., in nitrogen or other inert gas.

For example, PDC formulation ranges that produced improved anode materials include materials with 55% silicon hydride content, which after pyrolysis, produced anodes with a reversible capacity of 450 mAh/g, exceeding the theoretical capacity of pure graphite at 372 mAh/g (operational, practical pure graphite being less than that, e.g. ~360 mAh/g). For example, material with 18% silicon hydride starting content after pyrolysis to ceramic produced anode materials with a specific capacity of 930 to 997 mAh/g. By controlling a ratio of silicon, oxygen and carbon, other ceramic materials have been demonstrated to achieve 1,182 mAh/g, which is greater than three times that of pure graphite. This is very surprising and unexpected. It exceeds even capacity of those ceramic—graphine mixtures disclosed in US Patent Publication No. US2016/0056451 that were recited in the background.

Tables 3 and 4 provide examples of a range of starting material compositions for the PDCs. Alkoxysilanes or the corresponding chlorosilanes may produce a range of PDC compositions. Alkoxysilanes may comprise Methoxysilanes, Ethoxysilanes, Propoxysilanes, or Butoxysilanes, for example.

In addition, other elements may be added to silicon, carbon, and oxygen. For example, in one method, an electrode was made using (A) the reducing capability of the silicon hydride constituent of the PDC precursor to reduce organometallic materials such as tin containing, zinc containing, or other organometallic materials such as nickel, cobalt, manganese, titanium, zirconium, vanadium and lithium containing organics. For example, this produces a uniform dispersion of tin in a cured PDC. A tin-doped PDC may further enhance properties of reclaimed battery anode materials, for example. In another exemplary method, an electrode was made using (B) metal containing alkoxides, metal containing chlorides, or metal containing hydroxides, for example, adding metals to the PDC precursor formulation, or adding back any critical metals such as cobalt, nickel, manganese, or other needed metals during the initial condensation/polymerization/hydrolysis synthesis stage. In this example, any metal that may be made into an alkoxide, chloride or hydroxide may be incorporated into a PDC electrode material.

In one example, adding nickel and cobalt isopropoxides to a formulation during the initial synthesis and reacting of a PDC may add back nickel or cobalt that was depleted from reclaimed cathode materials during scrap battery disassembly and reprocessing. Metals in a PDC precursor molecule may already be in their oxide form and may carry through to a subsequent ceramic material after pyrolysis. Any alkoxide, chloride, or hydroxide could also be added to an initial PDC precursor resin after synthesis via reacting with the assistance of an organometallic catalyst such as zinc octoate, for example.

In one example, a method for producing a battery electrode coating material from a thermosetting PDC polymer composition comprises the following materials: Methylhydrogen siloxane (MHF), Dicyclopentadiene (DCPD), 2% platinum catalyst (PtC), and Tetravinyltetramethylcyclotetrasiloxane (TVC). For example, a 5 liter 4-necked round bottom jacketed flask is set up with a mechanical stirrer and a condenser at one neck. 3 kg of methylhydrogen siloxane is added to the flask. The flask is then stirred and heated to roughly 30° C. and 2 ppm of platinum from the catalyst solution is added. The siloxane will bubble and foam and the temperature will rise 4-5° C. Once the temperature stops rising, 1 kg of dicyclopentadiene is added to the siloxane. The temperature will begin to rise as the hydrosilation reaction begins. Once the temperature reaches 85° C., the temperature will rise very rapidly to a maximum in the range of 165 to 180° C. and quickly begin to fall. The reaction is complete when the polymer cools down to room temperature. Once the polymer is cooled to room temperature, 600 grams of tetravinyltetramethylcyclotetrasiloxane is added while the polymer is still stirring in the flask. The composition of the polymer can easily be changed by changing the ratio of MHF to DCPD and/or changing the crosslinker from TVC to another material such as divinylbenzene. Changing the composition of the polymer or changing the type of reactants changes the composition and structure of the resulting ceramic.

In another example, a method for producing a battery electrode coating material from a thermoplastic PDC polymer composition comprises the following materials: Phenyltriethoxysilane; Dimethyldiethoxysilane; Vinyltriethoxysilane; Diphenyldiethoxysilane; Acetone or ethanol; and Acid/water solution pH 1.5-2. A 5 liter 4-necked round bottom jacketed flask is set up with a mechanical stirrer and a condenser at one neck. 345 grams of acetone and 210 grams of the pH 2 water are mixed in the 5 liter flask. The ethoxysilanes are mixed together prior to pouring into the acetone water mixture. (other alkoxysilanes may be substituted, as can chlorosilanes as long as they have the same substituents (phenyl, methyl, vinyl etc.) eg. Phenyltrichlorosilane, or phenyltrimethoxysilane. The ratio by mass of ethoxysilanes for this example may vary depending on the desired structure of the polymer and resulting pyrolyzed ceramic. For example, Phenyltriethoxysilane: 57.5%; Dimethyldiethoxysilane: 12.5%; Vinyltriethoxysilane: 5%; Diphenyldiethoxysilane: 25%. Once blended, the ethoxysilanes (in this case 1 kg of liquid) are mixed into the water/acetone mixture via an addition funnel over a 5 minute period (~200 g/min.). The mixture will self-heat from roughly room temperature to about 40-45° C. over about 30 minutes. The flask is then heated until the silane/acetone/water mixture is stable at 62-68° C. (the final reflux temperature depends on the silane composition). The reaction is run at near reflux temperature for a minimum of 20 hours. The mixture is allowed to cool to below 30° C. before removal from the flask. The polymer/acetone/water mixture is poured into a 6 liter separatory funnel already containing 1.8 liters of distilled water. The whole flask is shaken or vigorously stirred for 1 minute before being set back into its stand to allow the polymer to settle out of the mixture. After a minimum of 1 hour, the resulting slightly amber polymer should be visible with a very defined separation line between the polymer (lower amber liquid) and the water/acetone (upper cloudy liquid). The bottom stopcock may be used to drain the polymer into a pan while leaving the water/acetone mixture in the funnel. The polymer still contains some solvent and water, so it is dried by either setting pan containing the polymer in a mechanical convection oven set at 80° C. for 2 hours or by using a Rotovap or wiped film still to remove the residual water and acetone. Once dried, the polymer will be a somewhat viscous (viscosity depends on composition) liquid that is ready to be mixed with solvent or heated to render it liquid enough to coat the reclaimed battery electrode materials. The polymer would then be catalyzed and used to coated electrode materials which can then be cured and pyrolyzed as described in "3" below.

In one method a ceramic coated post-recycled battery electrode powder is reclaimed using a PDC polymer. 50 grams of either the thermosetting or thermoplastic polymer, such as described previously, may be poured into a plastic beaker and mixed with 20 ppm of platinum from a catalyst solution. The mixture is stirred for 2 minutes with a spatula to mix in the catalyst.

For example, the catalyzed polymer may then mixed with a measured amount of reclaimed battery electrode powder and poured in roughly equal amounts into two 2.5" diameter aluminum pans. It is thought, without being limiting, necessarily, that mixing the reclaimed battery electrode powder with the catalyzed polymer prior to crosslinking of the polymer is preferred. At any rate, the PDC polymer is mixed with contaminated materials of the post-recycled batteries prior to pyrolysis, neutralizing the contaminants and providing substantial benefits in electrical and mechanical properties of the electrode produced from the powder created after pyrolysis is complete.

Continuing the process, for example, the pans may be placed into a convection oven set to 50° C. and heated according to the following schedule: 1 hour at 50° C.; 2 hours at 80° C. 2 hours at 110° C. and 2 hours at 130° C. followed by a slow cooldown. The resulting material is a "hard plastic" disk that typically is easy to remove from the aluminum pan. The disks are then crushed with a roller-crusher system into a fine powder prior to pyrolysis.

The cured polymer coated powder may be placed into a quartz or alumina ceramic boat and placed in the hot zone of a 1100° C. capable inert gas furnace. The furnace is sealed and purged with flowing nitrogen or argon to remove oxygen and heated according to the following cycle: 400° for 4 hours; 600° C. for 4 hours; 800° C. for 4 hours; and 1000° C. for 4 hours, followed by a slow cool to room temperature while still under inert gas. The powder will have agglomerated during pyrolysis into ceramic. The ceramic material is then placed into a small attritor and ground down to the required 1-20 microns required for mixing with the binder materials to form an electrode slurry.

Then, using any conventional or proprietary processes, the electrode slurry may be formed into a disk, dried and incorporated into a battery, for example. For example, the electrode may be an anode for a lithium ion or lithium polymer battery.

Figure 9:
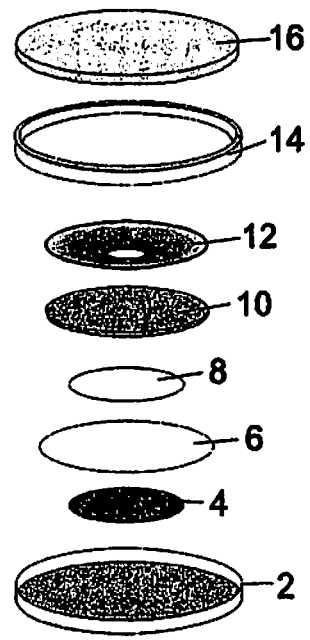
FIG. 9 illustrates an example of the component layers of a lithium battery.

FIG. 9 illustrates an example of a coin cell battery for testing batteries, which may be made using one of the examples of an anode and/or cathode made using a PDC precursor mixed with post-recycled, contaminated electrode materials. A conventional cathode may be used with a post-recycled contaminated anode material for the anode reclaimed using the PDC precursor and pyrolyzation, for example. The battery has a bottom casing 2, an anode 4, a microporous separator 6, a cathode 8, a spacer 10, a disk spring 12, a gasket 14 and a top casing 16. An electrolyte, such as LiPF6 (lithium hexafluorophosphate) in 1:1 ethylene carbonate (EC):dimethyl carbonate (DMC), may be used to carry charges between the cathode and the anode through the separator, for example. Other conventional electrolytes may be used as are known.

Figure 10:
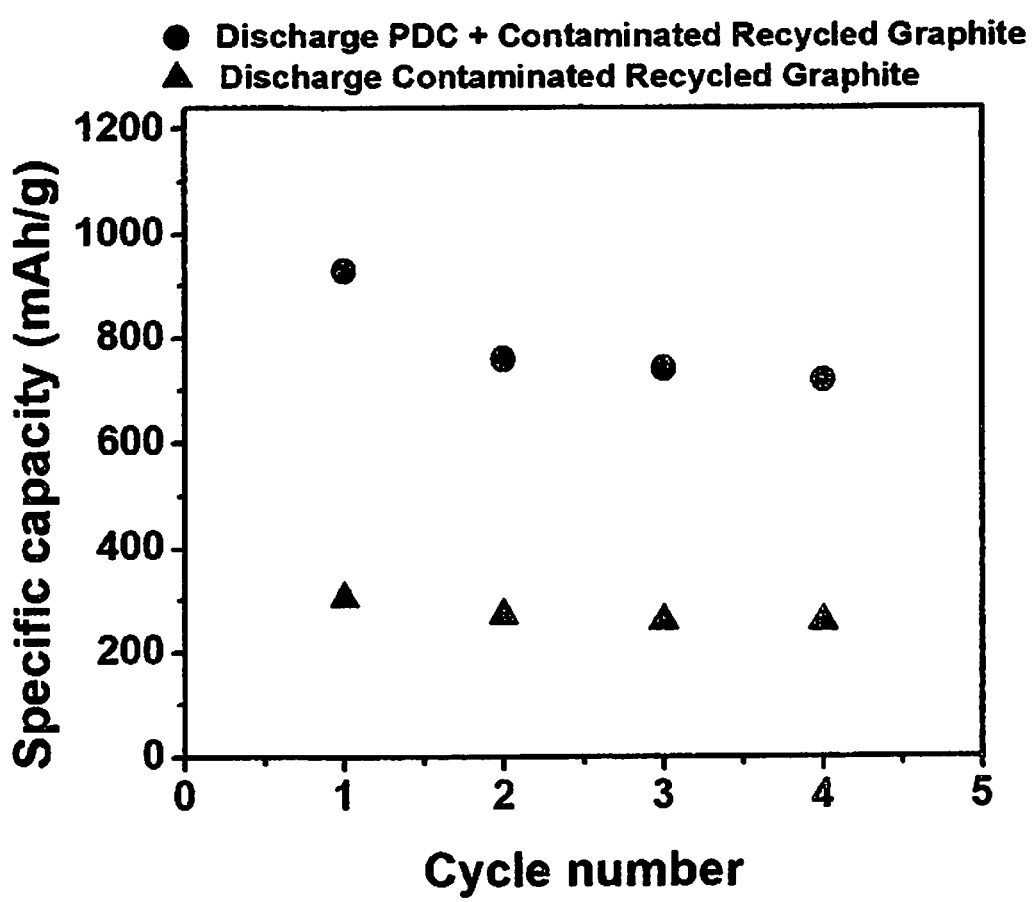
FIG. 10 illustrates an example of a data comparing a lithium ion battery using contaminated recycled graphite for the anode and using contaminated graphite treated with a thermoplastic PDC according to an example of the invention.

FIG. 10 illustrates results for another example of an electrode. The graphically illustrated data is discharge performance for a lithium ion battery with anode material comprising contaminated recycled graphite, comparing the contaminated recycled graphite with contaminated recycled graphite—PDC enhanced, using an example with a thermoplastic PDC. The contaminated recycled graphite contains approximately 13% contaminants. In this example, first cycle efficiency for the contaminated recycled graphite control anode is 82.62% and first cycle efficiency for PDC+ contaminated recycled graphite anode is 77.04%; 65% PDC+35% Contaminated Recycled Graphite; 85:10:5 (Active Material:Binder:Conductive Carbon Additive in Solvent); Cycling Rate: 37 mA/g; Potential Window: 0.005-3V; Mass Loading: 2.50 mg/cm2. For the 100% Contaminated Recycled Graphite; 85:10:5 (Active Material:Binder:Conductive Carbon Additive in Solvent); Cycling Rate: 37 mA/g; Potential Window: 0.005-3V; Mass Loading: 3.61 mg/cm2. The results using PDC are surprising and unexpected, producing an electrode with superior electrical characteristics from a contaminated graphite source material.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. An electrode comprising contaminated graphite from spent lithium ion batteries, the contaminated graphite comprising graphite and contaminants, and a polymer precursor selected such that the polymer precursor forms a polymer derived ceramic when mixed with the contaminated graphite and pyrolyzed, wherein the contaminated graphite and the polymer precursor are pyrolyzed and microscopically form silicon carbon compounds that protect the electrode from degradation by the contaminants in the contaminated graphite that would otherwise cause degradation of the electrode during discharge and recharge cycling.

2. The electrode of claim 1, wherein the polymer precursor is synthesized by an acid or base hydrolysis/condensation/polymerization of silicon alkoxide monomer, wherein the silicon alkoxide monomer comprises a silicone atom with up to four alcohol groups attached to the silicon atom.

3. The electrode of claim 2, wherein the silicon alkoxide monomer comprises tetraethoxysilane.

4. The electrode of claim 2, wherein the silicone alkoxide monomer comprises a methoxysilane, an ethoxysilane, a propoxysilane, or a butoxysilane.

5. The electrode of claim 2, wherein the silicone alkoxide monomer comprises a phenyltriethoxysilane, a diphenyldiethoxysilane, a phenylmethyldiethoxysilane, a vinylphenyldiethoxysilane, a methyltriethoxysilane, a dimethyldiethoxysilane, a methyldiethoxysilane, a triethoxysilane, a methylvinyldiethoxysilane, a vinyltriethoxysilane, a trimethylethoxysilane, a tetraethoxysilane, or a corresponding chlorosilane thereof.

6. The electrode of claim 5, further comprising organometallic materials.

7. The electrode of claim 6, wherein the organometallic materials are comprised of metal containing alkoxides, metal containing chlorides, or metal containing hydroxides added to the polymer precursor prior to pyrolysis.

8. The electrode of claim 6, wherein the organometallic materials comprise nickel or cobalt isopropoxides added during synthesis of the polymer precursor.

9. The electrode of claim 1, wherein the polymer precursor comprises a phenyl containing monomer, and the phenyl containing monomer is selected in a range from 10 mole percentage to 80 mole percentage of the polymer precursor.

10. The electrode of claim 9, wherein the polymer precursor further comprises a methyl containing monomer in a range from 10 to 50 mole percentage, a vinyl containing monomer in a range from 0 to 60 mole percentage, and a hydride containing monomer in a range from 5 to 35 mole percentage.

11. The electrode of claim 9, wherein the polymer precursor comprises a phenylsilane, diphenylsilane, methylphenylsilane or methylphenylvinylsilane.

12. The electrode of claim 1, wherein the polymer precursor comprises a siloxane.

13. The electrode of claim 12, wherein the siloxane is a tetravinyltetramethylcyclotetrasiloxane mixed with a reactant of a methylhydrogen siloxane and hydrosilation with a dicyclopentadiene or a divinylbenzene, wherein a catalyst catalyzes the methylhydrogen siloxane prior to hydrosilation with the dicyclopentadiene or the divinylbenzene, forming a reactant before mixing the reactant with the tetravinyltetramethylcyclotetrasiloxane.

14. The electrode of claim 12, wherein the siloxane comprises a tetramethylcyclotetrasiloxane, a methylhydrogen siloxane, a co-polymer of dimethylsiloxane/methylhydrogen siloxane, a phenylmethylsiloxane/methylhydrogen siloxane, or a diphenylsiloxane/methylhydrogen siloxane.

15. The electrode of claim 12, wherein the siloxane comprises a polydimethylvinylsiloxane, a polyphenylmethylvinylsiloxane, a polydimethylvinylsiloxane, or a polydimethyldiphenylvinylsiloxane.

16. The electrode of claim 1, wherein the polymer precursor comprises a cyclic polyene.

17. The electrode of claim 16, wherein the polymer precursor comprises a cyclobutadiene, a cyclopentadiene, a cyclohexadiene, a norbornadiene, or a bismaleimide.

18. The electrode of claim 17, wherein the polymer precursor comprises N,N'-p-phenylenebismaleimide.

19. The electrode of claim 1, wherein the polymer precursor comprises a polycyclic polyene.

20. The electrode of claim 19, wherein the polycyclic polyene is comprised of cyclopentadiene oligomers.

21. The electrode of claim 1, wherein the polymer precursor comprises a dicyclopentadiene, a tricyclopentadiene, a tetracyclopentadiene, a norbornadiene dimer, a dimethanohexahydronaphthalene, a bicycloheptadiene, a dimethanohexahydronaphthalene, or substituted derivatives of any thereof.

22. The electrode of claim 1, wherein the polymer precursor comprises a methyl dicyclopentadiene.

23. The electrode of claim 1, wherein the polymer precursor comprises a styrene, a divinyl benzene, or a polybutadiene.

24. A process of recycling lithium ion electrode materials for reuse in the electrode of claim 1, the process comprising:
    selecting post-recycled lithium ion battery raw electrode materials comprising graphite or graphite and one or more of hard carbon, misocarbon microbeads (MCMB), or graphene and one or more of the following contaminants: silicon, lithium titanate (LTO), lithium, iron, vanadium, aluminum, cobalt, nickel, manganese, or combinations thereof;
    combining and processing the post-recycled lithium ion battery raw electrode materials with a polymer precursor that forms a polymer derived ceramic (PDC) material when pyrolyzed to form a mixture of the polymer precursor and the post-recycled lithium ion battery raw electrode materials;
    heating the mixture under a non-oxidizing atmosphere at a pyrolysis temperature selected from 900 to 1200 degrees centigrade, substantially neutralizing the contaminants and producing a pyrolyzed substance;
    milling the pyrolyzed substance into a powder; and
    forming the powder into an electrode for battery.

* * * * *